United States Patent [19]

Kühl

[11] Patent Number: 4,559,213

[45] Date of Patent: * Dec. 17, 1985

[54] SYNTHESIS OF ZSM-12 ZEOLITE

[75] Inventor: Günter H. Kühl, Cherry Hill, N.J.

[73] Assignee: Mobil Oil Corporation, New York, N.Y.

[*] Notice: The portion of the term of this patent subsequent to Nov. 13, 2001 has been disclaimed.

[21] Appl. No.: 651,202

[22] Filed: Sep. 17, 1984

Related U.S. Application Data

[63] Continuation-in-part of Ser. No. 490,082, Apr. 29, 1983, Pat. No. 4,482,531.

[51] Int. Cl.$^4$ .............................................. C01B 33/28
[52] U.S. Cl. .................................. 423/329; 423/326; 423/331; 423/332
[58] Field of Search ................................ 423/326–333, 423/435; 502/60, 62, 77

[56] References Cited

U.S. PATENT DOCUMENTS

| | | | |
|---|---|---|---|
| 3,832,449 | 8/1974 | Rosinski et al. | 423/328 |
| 4,061,717 | 12/1977 | Kerr et al. | 423/329 |
| 4,285,922 | 8/1981 | Audeh et al. | 423/329 |
| 4,303,791 | 12/1981 | Audeh | 544/351 |
| 4,331,643 | 5/1982 | Rubin et al. | 423/329 |
| 4,391,785 | 7/1983 | Rosinski et al. | 423/329 |
| 4,482,531 | 11/1984 | Kuehl | 423/329 |

FOREIGN PATENT DOCUMENTS 2077709 12/1981 United Kingdom ................ 423/328

OTHER PUBLICATIONS

T. P. Abbiss and F. G. Mann, *Triethylenediamine (1,4-Diazabicyclo-(2,2,2)Octane) and Hexaethylenetetramine. The Interaction of Triethylenediamine and Dibromomethane, 1,2-Dibromoethane, and 1,3-Dibromopropane*, Journal of the Chemical Society, 1964, pp. 2248–2254.

*Primary Examiner*—Edward J. Meros
*Attorney, Agent, or Firm*—Alexander J. McKillop; Michael G. Gilman; Edward F. Kenehan, Jr.

[57] ABSTRACT

There is disclosed a process for preparing a ZSM-12 crystalline zeolite wherein the organic template used in the synthesis has the formula:

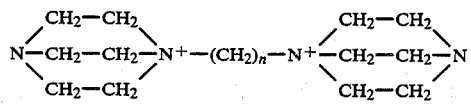

wherein n=4–10. The template, designated herein DABCO-$C_n$-diquat, is obtained from a dihalide salt of the template or from a hydroxide thereof.

7 Claims, No Drawings

SYNTHESIS OF ZSM-12 ZEOLITE

CROSS-REFERENCE TO RELATED APPLICATION

This application is a continuation-in-part of copending U.S. application Ser. No. 490,082, filed Apr. 29, 1983 now U.S. Pat. No. 4,482,531, the entire disclosure of which is expressly incorporated herein by reference.

BACKGROUND OF THE INVENTION

1. Field of the Invention

This invention relates to a novel method of synthesis of ZSM-12 zeolite.

2. Discussion of Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as having a rigid three-dimensional framework of $SiO_4$ and $AlO_4$ in which the tetrahedra are cross-linked by their sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed by the relationship of aluminum to the cations, wherein the ratio of aluminum to the number of various cations, such as Ca/2, Sr/2, Na, K, Cs or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. The aluminosilicates have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-23 (U.S. Pat. No. 4,076,842), ZSM-35 (U.S. Pat. No. 4,016,245), and ZSM-38 (U.S. Pat. No. 4,046,859).

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5, up to infinity. U.S. Pat. No. 3,941,871, now U.S. Pat. No. Re. 29,948, the entire contents of which are incorporated herein by reference, discloses a porous crystalline silicate zeolite made from a reaction mixture contining no deliberately added alumina in the recipe and exhibiting the X-ray diffraction pattern characteristic of ZSM-5 type zeolites. U.S. Pat. Nos. 4,061,724, 4,073,865 and 4,104,294, the entire contents of all three patents being incorporated herein by reference, describe crystalline silicates or organosilicates of varying alumina and metal content.

ZSM-12 has previously been synthesized in the presence of tetraethyl ammonium cations, used as the organic template (see, U.S. Pat. No. 3,832,449, the entire contents of which are incorporated herein by reference).

It has now been found that ZSM-12 zeolite can also be prepared in the presence of a new organic template described below.

SUMMARY OF THE INVENTION

ZSM-12 zeolite is prepared in accordance with this invention in a process comprising preparing a reaction mixture comprised of sources of an alkali or alkaline earth metal, alumina, silica, $RN^+$ and water, and having the following composition, in terms of mole ratios of oxides:

TABLE I

| | Broad | Preferred | Most Preferred |
|---|---|---|---|
| $OH^-/YO_2$ | 0.10–0.40 | 0.15–0.30 | 0.17–0.25 |
| $RN^+/(RN^+ + M)$ | 0.20–0.95 | 0.28–0.90 | 0.30–0.50 |
| $H_2O/OH^-$ | 20–300 | 50–200 | 80–150 |
| $YO_2/W_2O_3$ | 40–5000 | 60–500 | 90–300 | wherein Y is silicon or germanium, M is an alkali or alkaline earth metal, W is aluminum or gallium and $RN^+$ is a functional group, of which there are two in the organic cation, the organic cation being designated herein DABCO-$C_n$-diquat or $(RN)_2^{2+}$, and derived from a halogen salt or hydroxide of DABCO-$C_n$-diquat and maintaining the mixture at crystallization conditions until crystals of ZSM-12 are formed. Thereafter, the crystals are separated from the liquid and recovered. Typical reaction conditions consist of heating the foregoing reaction mixture to a temperature of from about 80° C. to 180° C. for a period of time of from about 6 hours to 150 days. A more preferred temperature range is from about 150° C. to 170° C. with the amount of time at a temperature in such range being from about 5 days to 30 days. The halogen salt of DABCO-$C_n$-diquat is obtained by reacting two (2) molecules of diazabicyclo(2,2,2)octane (DABCO—a registered trademark of Air Products and Chemicals, Inc.), also known in the art as triethylenediamine (TED), with one (1) molecule of dihalo-n-alkane of the formula:

$$X-(CH_2)_n-X$$

wherein X is a halogen and n is 4–10. The hydroxide form of DABCO-$C_n$-diquat is prepared by converting the halogen salt of DABCO-$C_n$-diquat in a conventional manner. When either the halogen salt or the hydroxide of DABCO-$C_n$-diquat are dissolved in an aqueous reaction mixture used to synthesize ZSM-12 zeolite, they dissociate into the cation (RN)$_2{}^{2+}$ and the respective anion. The cation has the formula:

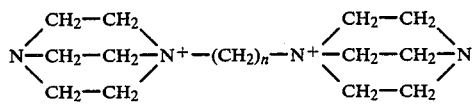

wherein n is 4–10. This functional group is the organic template of the present invention.

In the process of this invention, ZSM-12 is preferentially synthesized from a mixture containing a high silica to alumina ratio, for example more than about 50 to 1, at crystallization temperatures of about 160° C.

The digestion of the gel particles is carried out until crystals form. The solid product is separated from the reaction medium, as by cooling the whole to room temperature, filtering and water washing.

The foregoing product is dried, e.g., at 230° F., for from about 16 to 24 hours. Of course, milder conditions may be employed if desired, e.g., room temperature under vacuum.

ZSM-12 is preferably formed as an aluminosilicate. The composition can be prepared utilizing materials which supply the appropriate oxide. Such compositions include, for an aluminosilicate, sodium aluminate, alumina, sodium silicate, silica hydrosol, silica gel, silicic acid, sodium hydroxide and DABCO-C$_n$-diquat compounds, e.g., DABCO-C$_n$-diquat dibromide. It will be understood that each oxide component utilized in the reaction mixture for preparing a member of the ZSM-12 zeolite can be supplied by one or more initial reactants and they can be mixed together in any order. For example, sodium oxide can be supplied by an aqueous solution of sodium hydroxide, or by an aqueous solution of sodium silicate; DABCO-C$_n$-diquat can be supplied by DABCO-C$_n$-diquat dibromide or by DABCO-C$_n$-diquat hydroxide. The reaction mixture can be prepared either batchwise or continuously. Crystal size and crystallization time of the ZSM-12 composition will vary with the nature of the reaction mixture employed.

DETAILED DESCRIPTION OF THE INVENTION

ZSM-12 compositions can be identified in terms of mole ratios of oxides as follows:

$$(1.0\pm0.4)L_{2/m}O:W_2O_3:(40-5000)YO_2:zH_2O$$

wherein L is a cation, m is the valence thereof, W is aluminum or gallium, Y is silicon or germanium and z is from 0 to 60. The cation L can be any cation present in the ZSM-12 composition in the as-synthesized form or exchanged thereinto after the synthesis, e.g., alkali or alkaline earth metal, ammonium, hydrogen or the DABCO-C$_n$-diquat cation. It should be noted that in the analysis of the zeolite the value of nitrogen can exceed 1.4 by reason of occluded organic nitrogen compound in the crystalline product.

As mentioned above, DABCO-C$_n$-diquat dihalide is obtained by reacting two (2) molecules of diazabicyclo(2,2,2)octane (DABCO) with one (1) molecule of the dihalo-n-alkane of the formula:

$$X-(CH_2)_n-X$$

wherein X is a halogen, e.g., fluorine (F), chlorine (Cl), bromine (Br) or iodine (I), preferably bromine or iodine, and n is 4–10. The halogen derivative of DABCO-C$_n$-diquat may be used to introduce the organic template in the ZSM-12 synthesis and its structure, in the as-synthesized form, is as follows:

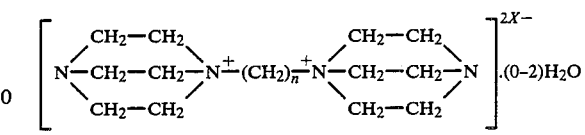

wherein X and n are as defined above. Each of the two DABCO molecules used in the synthesis of this compound has only one of its nitrogen atoms quaternized, and therefore carrying a positive charge. The halogen derivative of DABCO-C$_n$-diquat is used as the ZSM-12 synthesis template. It is soluble in water and forms a stable solution of cations having the formula:

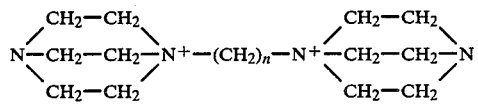

and halogen anions. It will be apparent to those skilled in the art that the halogen form of DABCO-C$_n$-diquat can be converted into the hydroxide form thereof by any conventional ion exchange techniques, e.g., those exemplified in U.S. Pat. Nos. 3,140,249, 3,140,251 and 3,140,251, the entire contents of all of which are incorporated herein by reference. Either the halogen or the hydroxide form of the DABCO-C$_n$-diquat can then be used in the ZSM-12 synthesis, because, as will be apparent to those skilled in the art, either of the two forms of the compound will dissociate in an aqueous solution into the respective cations and anions.

The synthesis of the halogen salt of DABCO-C$_n$-diquat is conducted with constant stirring in methanol at the temperature of about 45°–55° C. in the manner described in detail by T. P. Abbiss and F. G. Mann in *Triethylenediamine(1,4-Diazabicyclo-[2,2,2]octane) and Hexaethylenetetramine. The Interaction of Triethylenediamine and Dibromomethane, 1,2-Dibromoethane, and 1,3-Dibromopropane.* JOURNAL OF THE CHEMICAL SOCIETY, published by Chemical Society (London, 1964), pp 2248–2254, the entire contents of which are incorporated herein by reference. If desired, the halogen salt can be converted to the hydroxide form of the DABCO-C$_n$-diquat in any conventional manner.

The DABCO-C$_n$-diquat, in its halogen or hydroxide form, is then used to synthesize ZSM-12 zeolite in the reaction mixture of Table 1.

In a preferred embodiment of ZSM-12 synthesis, W is aluminum, Y is silicon, X is Br or I, M is sodium or potassium and the silica/alumina ratio is 60–500. In the most preferred embodiment M is sodium, W is aluminum, Y is silicon, X is Br, n=5 and the silica to alumina ratio is 90–300.

ZSM-12 zeolites produced in the process of this invention possess a definite distinguishing crystalline structure whose X-ray diffraction pattern shows the following significant lines:

TABLE II

| INTERPLANAR SPACING D(A) | RELATIVE INTENSITY 100 I/I |
|---|---|
| 11.9 ± 0.2 | W |
| 10.1 ± 0.2 | W |
| 4.71 ± 0.1 | W |
| 4.26 ± 0.08 | VS |
| 3.96 ± 0.08 | W |
| 3.88 ± 0.07 | S |
| 3.46 ± 0.07 | M |
| 3.38 ± 0.07 | M |
| 3.20 ± 0.06 | W |
| 3.07 ± 0.05 | W |
| 2.52 ± 0.03 | W |

These values were determined by standard techniques using the Philips APD-3600 diffraction system. The radiation was the K-alpha doublet of copper, and a spectrometer equipped with a scintillation detector, interfaced with a computer system and disc drive was used. The data was collected by step-scanning at intervals of 0.02 degrees 2 theta at a counting time of 2 seconds per step. The peak heights, I, and the positions as a function of 2 times theta, where theta is the Bragg angle, were derived by computer techniques using the second derivative method. From these, the relative intensities, 100 $I/I_o$, where $I_o$ is the intensity of the strongest line or peak, and D(obs.), the interplanar spacing in A, corresponding to the recorded lines, were computed. In Table II the relative intensities are given in terms of the symbols VS=very strong, S=strong, M=medium and W=weak. It should be understood that this X-ray diffraction pattern is characteristic of all the species of ZSM-12 compositions. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment.

The X-ray diffraction pattern of ZSM-12 can be indexed in the monoclinic system with lattice parameters having the following values:

a=24.9±0.4A.
b=5.0±0.1A
c=12.15±0.2A. and the angle
$\beta$=107.7°±1°.

ZSM-12 zeolites are useful in cracking and hydrocracking and in other petroleum refining processes indicating the unique catalytic characteristics of this family of zeolites. The latter processes include reduction of pour point of paraffinic charge stocks; isomerization of n-paraffins and naphthenes; polymerization of compounds containing an olefinic or acetylinic carbon to carbon linkage, such as isobutylene, butene-1 and butadiene; reforming, alkylation, isomerization of polyalkyl substituted aromatics, e.g., ortho-xylene and disproportionation of aromatics, such as toluene to provide a mixture of benzene, xylenes and higher methylbenzenes; dehydration, hydration, dehydrogenation. The ZSM-12 catalysts have exceptional high selectivity and under the conditions of hydrocarbon conversion provide a high percentage of desired products relative to total products compared with known zeolitic hydrocarbon conversion catalysts.

ZSM-12 zeolites, as indicated above, are also useful in catalytic processes, such as catalytic cracking of hydrocarbons and hydrocracking. In addition to the thermal stability of this family of zeolites under these conditions, they catalyze conversion of chargestocks to materials which are of greater economic value. The ability to be physically stable under high temperatures and/or in the presence of high temperature steam is extremely important for a cracking catalyst. However, this cracking is accompanied by a number of complex side reactions, such as aromatization, polymerization, alkylation and the like. As a result of these complex reactions, a carbonaceous deposit is laid down on the catalyst which is referred to by petroleum engineers as "coke." The deposit of coke on the catalyst tends to seriously impair the catalyst efficiency for the principal reaction desired and to substantially decrease the rate of conversion and/or the selectivity of the process. Thus, it is common to remove the catalyst after coke has been deposited thereon and to regenerate it by burning the coke in a stream of oxidizing gas. The regenerated catalyst is returned to the coversion stage of the process cycle. The enhanced thermal stability of ZSM-12 is advantageous in this regard.

ZSM-12 zeolites can be used either in the alkali metal form, e.g., the sodium form; the ammonium form, the hydrogen form; or the multivalent forms or combinations of these forms are employed. They can also be used in intimate combination with a hydrogenating component, such as tungsten, vanadium, molybdenum, rhenium, nickel, cobalt, chromium, manganese, or a noble metal such as platinum or palladium where a hydrogenation or dehydrogenation function is to be performed. Such component can be exchanged into the composition, impregnated therein or physically intimately admixed therewith. Such component can be impregnated in or on to the ZSM-12 composition, such as, for example, in the case of platinum, treating the composition with a platinum metal-containing ion. Thus, suitable platinum compounds include chloroplatinic acid, platinous chloride and various compounds containing the platinum ammine complex.

The compounds of the useful platinum or other metals can be divided into compounds in which the metal is present in the cation of the compound and compounds in which it is present in the anion of the compound. Both types of compounds which contain the metal in the ionic state can be used. A solution in which platinum metals are in the form of a cation or cation complex, e.g., [Pt(NH$_3$)$_4$]Cl$_2$, is particularly useful. For some hydrocarbon conversion processes, this noble metal form of the ZSM-12 catalyst is unnecessary such as in low temperature, liquid phase ortho xylene isomerization.

When ZSM-12 is employed as an absorbent or as a catalyst in one of the aforementioned processes, partial dehydration of the ZSM-12 material is necessary. This can be accomplished by heating to a temperature of about 200° to about 600° C. in an atmosphere such as air, nitrogen or the like, at atmospheric or subatmospheric pressures for between 1 and 48 hours. Dehydration can also be performed at lower temperatures by placing the ZSM-12 catalyst in a vacuum, however, a longer time is required to obtain a sufficient amount of dehydration.

The original cations of the as-synthesized ZSM-12 may be replaced at least in part by other ions using conventional ion exchange techniques. It may be necessary to precalcine the ZSM-12 zeolite crystals prior to ion exchange. The replacing ions introduced to replace the original alkali, alkaline earth and/or organic cations may be any that are desired so long as they can pass through the channels within the zeolite crystals. The as-synthesized zeolite may be conveniently converted into the hydrogen, the univalent or multivalent cationic forms by base exchanging the zeolite to remove the sodium cations by such ions as hydrogen (from acids, ammonium, alkylammonium and arylammonium including $RNH_3$, $R_3NH^+$, $R_2NH_2$ and $R_4N^+$ where R is alkyl or aryl, provided that steric hindrance does not prevent the cations from entering the cage and cavity structure of the ZSM-12 type crystalline zeolite. The hydrogen form of the zeolite, useful in such hydrocarbon conversion processes as isomerization of poly-substituted alkyl aromatics and disproportionation of alkyl aromatics, is prepared, for example, by base exchanging the sodium form with, e.g., ammonium chloride or hydroxide, whereby the ammonium ion is substituted for the sodium ion. The composition is then calcined, at a temperature of, e.g., 1000° F. (about 540° C.), causing evolution of ammonia and retention of the hydrogen proton in the composition. Other replacing cations include cations of the metals of the Periodic Table, particularly metals other than sodium, most preferably metals of Group IIA, e.g., zinc, and Groups IIIA, IVA, IB, IIB, IIIB, IVB, VIB and Group VIIIA of the Periodic Table, and rare earth metals and manganese.

Ion exchange of the zeolite can be accomplished conventionally, e.g., by packing the zeolite into a series of vertical fixed bed columns and successively passing through the beds an aqueous solution of a soluble salt of the cation to be introduced into the zeolite, and then changing the flow from the first bed to a succeeding one as the zeolite in the first bed becomes ion exchanged to the desired extent. Aqueous solutions of mixtures of materials to replace the sodium can be employed. For instance, if desired, one can exchange the sodium with a solution containing a number of rare earth metals suitably in the chloride form. Thus, a rare earth chloride solution commercially available can be used to replace substantially all of the sodium in the as-synthesized ZSM-12 zeolite. One such commercially available rare earth chloride solution contains chlorides of a rare earth mixture having the relative composition: cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, and other rare earth oxides 0.8% by weight. Another rare earth chloride mixture, which can also be used as an exchanging solution, but has a lower cerium content, consists of the following rare earth metals determined as oxides: lanthanum 45–65% by weight, cerium 1–2% by weight, praseodymium 9–10% by weight, neodymium 32–33% by weight, samarium 5–7% by weight, gadolinium 3–4% by weight, yttrium 0.4% by weight, and other rare earth metals 1–2% by weight. It is to be understood that other mixtures of rare earth metals are also applicable for the preparation of the novel compositions of this invention, although cerium, lanthanum, neodymium, praseodymium, samarium and gadolinium as well as mixtures of rare earth cations containing a predominant amount of one or more of the above cations are preferred.

Base exchange with various metallic and non-metallic cations can be carried out according to the procedures described in U.S. Pat. Nos. 3,140,251, 3,140,252 and 3,140,353, the entire contents of which are incorporated herein by reference.

Regardless of the cations replacing the alkali or alkaline earth metals in the as-synthesized form of the ZSM-12, the spatial arrangement of the aluminum, silicon and oxygen atoms which form the basic crystal lattices of ZSM-12, remains essentially unchanged by the described replacement of alkali or alkaline earth metal as determined by taking an X-ray powder diffraction pattern of the ion-exchanged material. Such X-ray diffraction pattern of the ion-exchanged ZSM-12 reveals a pattern substantially the same as that set forth in Table 2 above.

The aluminosilicates prepared by the instant invention are formed in a wide variety of particle sizes. Generally speaking, the particles can be in the form of a powder, a granule, or a molded product, auch as extrudate having a particle size sufficient to pass through a 2 mesh (Tyler) screen and be retained on a 400 mesh (Tyler) screen. In cases where the catalyst is molded, such as by extrusion, the aluminosilicate can be extruded before drying, or dried or partially dried and then extruded.

In the case of many catalysts, it is desired to incorporate the ZSM-12 with another material resistant to the temperatures and other conditions employed in organic conversion processes. Such materials include active and inactive materials and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the ZSM-12, i.e., combined therewith which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. Normally, zeolite materials have been incorporated into naturally occurring clays, e.g., bentonite and kaolin, to improve the crush strength of the catalyst under commercial operating conditions. These materials, e.g., clays, oxides, function as binders for the catalyst. It is desirable to provide a catalyst having good crush strength, because in a petroleum refinery the catalyst is often subjected to rough handling, which tends to break the catalyst into powder-like materials which cause problems in processing. The aforementioned clay binders have been employed for the purpose of improving the crush strength of the catalyst.

Naturally occurring clays which can be composited with the ZSM-12 catalyst include the montmorillonite and kaolin family, which families include the subbentonites, and the kaolins commonly known as Dixie McNamee-Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the ZSM-12 catalyst can be composited with a porous matrix material, such as silica-alumina, silica-magnesia, silica-zirconia, silica-thoria, silica-beryllia, silica-titania, as well as ternary compositions, such as silica-alumina-thoria, silica-alumina-zirconia, silica-alumina-magnesia and silica-magnesia-zirconia. The matrix can be in the form of a cogel. The relative proportions of finely divided crystalline aluminosilicate ZSM-12 and organic oxide gel matrix vary widely with the crystalline aluminosilicate content ranging from about 1 to 90 percent by weight and more usually, particularly when the composite is prepared in the form of beads, in the range of about 2 to about 50 percent by weight of the composite.

Employing the ZSM-12 catalyst of this invention, containing a hydrogenation component, heavy petroleum residual stocks, cycle stocks, and other hydrocrackable charge stocks can be hydrocracked at temperatures between 400° F. and 825° F. using molar ratios of hydrogen to hydrocarbon charge in the range of between 2 and 80. The pressure employed varies between 10 and 2,500 psig and the liquid hourly space velocity between 0.1 and 10.

Employing the catalyst of this invention for catalytic cracking, hydrocarbon cracking stocks can be cracked at a liquid hourly space velocity between about 550° F. and 1,100° F., a pressure between about subatmospheric and several hundred atmospheres.

Employing a catalytically active form of the ZSM-12 zeolite of this invention containing a hydrogenation component, reforming stocks can be reformed employing a temperature between 700° F. and 1,000° F. The reforming process pressure is between 100 and 1,000 psig but is preferably between 200 and 700 psig. The liquid hourly space velocity is generally between 0.1 and 10, preferably between 0.5 and 4 and the hydrogen to hydrocarbon mole ratio is generally between 1 and 20 preferably between 4 and 12.

The catalyst can also be used for hydroisomerization of normal paraffins, when provided with a hydrogenation component, e.g., platinum. Hydroisomerization is carried out at a temperature between 200° and 700° F., preferably 300° to 550° F., with a liquid hourly space velocity between 0.01 and 2, preferably between 0.25 and 0.50 employing hydrogen so that the hydrogen to hydrocarbon mole ratio is between 1:1 and 5:1. Additionally, the catalyst can be used for olefin or aromatic isomerization employing temperatures between 30° F. and 500° F.

The catalyst may also be used for reducing the pour point of gas oils. This reduction is carried out at a liquid hourly space velocity between about 10 and about 30 and a temperature between about 800° F. and about 1,100° F.

Other reactions which can be accomplished employing the catalyst of this invention containing a metal, e.g., platinum, include hydrogenation-dehydrogenation reactions and desulfurization reactions.

In order to more fully illustrate the nature of the invention and the manner of practicing the same, the following examples are presented.

In the examples which follow whenever adsorption data is set forth it was determined as follows:

A weighed sample of the zeolite was contacted with the desired pure adsorbate vapor in an adsorption chamber at a pressure less that the vapor-liquid equilibrium pressure of the absorbate at room temperature. This pressure was kept constant during the adsorption period which did not exceed about eight hours. Adsorption was complete when a constant pressure in the adsorption chamber was maintained, i.e., 12 mm of mercury for water and 20 mm for n-hexane and cyclohexane. The increase in weight in grams (g) per 100 g of calcined zeolite was calculated as the adsorption capacity of the sample.

EXAMPLE 1

(Synthesis of DABCO-$C_4$-diquat dibromide)

80 grams of 1,4-diazabicyclo[2,2,2]octane (DABCO) was dissolved in 100 ml methanol and placed in a 1 liter round bottom flask equipped with a magnetic stirring bar, reflux-condenser, thermometer, and addition funnel. 77.4 grams of 1,4-dibromobutane was added to the flask at such a rate that the reaction temperature was maintained at 50±5° C. After the addition of the 1,4-dibromobutane, the mixture was stirred at room temperature for 2 hours. Then, 300 ml of dry diethylether was added to the flask and solid product (DABCO-$C_4$-diquat dibromide) was filtered off the reaction mixture.

EXAMPLE 2

(Synthesis of DABCO-$C_5$-diquat dibromide)

80 grams of DABCO was dissolved in 100 ml methanol and placed in the apparatus of Example 1 above. 82.4 grams of 1,5-dibromopentane was added to the flask at such a rate that the reaction temperature was maintained at 50±5° C. After the addition of the 1,5-dibromopentane, the mixture was stirred at room temperature for 2 hours. Then, 300 ml of dry diethylether was added to separate the DABCO-$C_5$-diquat-dibromide as an oil from solvents. The lower layer (DIQUAT) was separated from the upper layer (solvents) and evaporated to the solid product (DABCO-$C_5$-diquat dibromide) by heating to 100° C. for 18 hours under vacuum (pressure of about 100 mm Hg).

EXAMPLE 3

(Synthesis of DABCO-$C_6$-diquat dibromide)

80 grams of DABCO was dissolved in 100 ml methanol and placed in the apparatus of Example 1, above. 87.5 g of 1,6-dibromohexane was then added to the flask at such a rate that the reaction temperature was maintained at 50±5° C. Then, the reaction mixture was stirred for 2 hours and 300 ml of dry diethylether was added to precipitate the product (DABCO-$C_6$-diquat dibromide). If desired, the product could be isolated by filtration.

EXAMPLE 4

(Synthesis of DABCO-$C_{10}$-diquat dibromide)

60 grams of DABCO was dissolved in 50 ml of methanol and placed in the apparatus of Example 1, above. A slurry of 25 ml methanol and 77.9 grams of 1,10-dibromodecane was added to the flask at such a rate that the reaction temperature was maintained at 50±5° C. After the addition of the 1,10-dibromodecane, the reaction mixture was stirred at room temperature for 2 hours. Then, 250 ml of dry diethylether was added to the reaction mixture, causing the product, DABCO-$C_{10}$-dibromide, to separate as an oil (bottom layer) from the solvents (top layer). The bottom layer (oily product) was separated and 900 ml of methylethylketone was added thereto. This two phase mixture was then stirred at room temperature until the product (DABCO-$C_{10}$-diquat dibromide) crystallized and could be isolated by filtration.

EXAMPLE 5

(Synthesis of ZSM-12 with DABCO-$C_5$-diquat dibromide)

0.8 g of aluminum nitrate, $Al(NO_3)_3 9H_2O$, was dissolved in 40 g of water. A solution of 10.55 g of DABCO-$C_5$-diquat dibromide, produced in Example 2, in 50 g of water was added, followed by the addition of a solution of 3.1 g of sodium hydroxide (98%) in 25 g of water. Finally, 24.0 g of Hi-Sil, a precipitated silica containing 87 wt % $SiO_2$, 6 weight (wt) % free water ($H_2O$) and 4.5 wt. % bound $H_2O$ of hydration and having a particle size of 0.02 micron ($\mu$), was added. The reaction mixture was heated in a Teflon-lined stainless steel autoclave at 160° C. and autogenous pressure for crystallization. After 299 hours at this temperature a crystalline product was obtained. It was separated from the mother liquor by filtration, washed and dried at ambient temperature.

The dried solid product had the X-ray diffraction pattern of ZSM-12 and had a crystallinity of 100%, compared with a reference sample. The sorptive capacities were, in g/100 g of solid at 25° C., after calcination in air at 550° C.:
  Cyclohexane, at 20 Torr 7.9
  n-Hexane, at 20 Torr 6.3
  Water, at 12 Torr 6.9
The composition of the zeolite was in weight %:
  $SiO_2$(calculated by difference) 84.4
  $Al_2O_3$ 1.0
  $Na_2O$ 0.78
  N 1.88
  Ash 86.2
  $SiO_2/Al_2O_3$, molar ratio 145

The material exhibited the X-ray diffraction pattern essentially as shown below in Table III.

TABLE III

| INTERPLANAR SPACING D(A) | RELATIVE INTENSITY 100 I/I |
| --- | --- |
| 11.95 | 13 |
| 10.16 | 5 |
| 6.16 | 2 |
| 5.96 | 2 |
| 4.71 | 12 |
| 4.46 | 2 |
| 4.26 | 100 |
| 4.11 | 6 |
| 3.96 | 12 |
| 3.88 | 52 |
| 3.76 | 3 |
| 3.64 | 3 |
| 3.46 | 18 |
| 3.38 | 15 |
| 3.20 | 6 |
| 3.07 | 4 |
| 3.03 | 2 |
| 2.919 | 3 |
| 2.879 | 3 |
| 2.649 | 3 |
| 2.589 | 2 |
| 2.525 | 13 |
| 2.472 | 4 |
| 2.335 | 3 |
| 2.053 | 6 |
| 1.987 | 2 |
| 1.951 | 4 |
| 1.900 | 2 |
| 1.851 | 2 |
| 1.821 | 2 |

Weak lines with intensities of less than 1.5 are not reported in Table III. The abbreviations and symbols used in Table III have the same meaning as those in Table II. Similarly, the data of Table III was derived in the manner identical to that of the data in Table II.

EXAMPLE 6

(Synthesis of ZSM-12 with DABCO-$C_{10}$-diquat dibromide)

The reaction mixture was the same as in Example 5, except that 12.2 g of DABCO-$C_{10}$-diquat dibromide was used instead of the corresponding $C_5$ compound. After 253 hours at 160° C., a crystalline material having an average particle size of about $0.05 \times 0.2\mu$ was obtained. It was separated from the mother liquor, washed and dried as in Example 5.

The dried solid had the X-ray diffraction pattern of ZSM-12, characteristic of small crystalline size and having a crystallinity of about 85%, measured by the peak heights. The sorptive capacities were, in g/100 g of solid at 25° C., after calcination in air at 550° C.:
  Cyclohexane, at 20 Torr 7.0
  n-Hexane, at 20 Torr 5.6
  Water, at 12 Torr 5.5

EXAMPLE 7

(Synthesis of ZSM-12 with potassium and DABCO-$C_{10}$-diquat dibromide)

The reaction mixture was the same as in Example 6, except that 4.0 g of potassium hydroxide, KOH, (86% KOH) was used instead of the 3.1 g of sodium hydroxide, NaOH, (98% NaOH). After 367 hours at 160° C., a crystalline material was obtained, separated from the mother liquor, washed and dried as in Example 5.

The dried solid had the X-ray diffraction pattern of ZSM-12 and a crystallinity of 75%. The sorptive capacities were, in g/100 g of solid at 25° C., after calcination in air at 550° C.:
  Cyclohexane, at 20 Torr 4.8
  n-Hexane, at 20 Torr 4.7
  Water, at 12 Torr 4.7

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

I claim:

1. A process for preparing a siliceous porous crystalline ZSM-12 zeolite material having the X-ray diffraction pattern of Table II, which comprises preparing a reaction mixture comprised of sources of an alkali or alkaline earth metal, alumina, silica, $RN^+$ and water, and having the following composition, in terms of mole ratios of oxides:
  $OH^-/YO_2 = 0.10$ to $0.40$
  $RN^+/(RN^+ + M) = 0.2$ to $0.95$
  $H_2O/OH^- = 20$ to $300$
  $YO_2/W_2O_3 = 60$ to $5000$
wherein Y is silicon or germanium, $(RN)_2^{2+}$ is DABCO-$C_n$-diquat, having the formula:

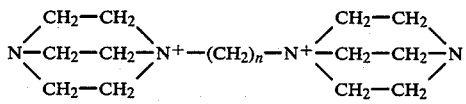

wherein n is 4–10, M is an alkali or alkaline earth metal, and W is aluminum or gallium, and maintaining the mixture at crystallization conditions until crystals of said zeolite are formed.

2. A process of claim 1 wherein the mixture has the following composition:

$OH^-/YO_2 = 0.15$ to $0.30$
$RN^+/(RN^+ + M) = 0.29$ to $0.90$
$H_2O/OH^- = 50$ to $200$
$YO_2/W_2O_3 = 60$ to $500$ wherein Y, $(RN)_2^{2+}$, M and W are the same as in claim 1.

3. A process of claim 2 wherein the mixture has the following composition:

$OH^-/YO_2 = 0.17$ to $0.25$
$RN^+/(RN^+ + M) = 0.30$ to $0.50$
$H_2O/OH^- = 80$ to $150$
$YO_2/W_2O_3 = 90$ to $300$ wherein Y, $(RN)_2^{2+}$, M and W are the same as in claim 1.

4. A process of claim 3 wherein M is potassium or sodium.

5. A process of claim 4 wherein M is sodium.

6. A process of claim 5 wherein the DABCO-$C_n$-diquat is derived from the halogen salt thereof, obtained by reacting two molecules of diazabicyclo(2,2,2)octane with one molecule of dihalo-n-alkane of the formula:

$$X—(CH_2)_n—X$$

wherein X is fluorine, chlorine, bromine or iodine and n=4–10.

7. A process of claim 6 wherein X is bromine.

* * * * *